US011462059B2

(12) United States Patent
Gray (10) Patent No.: US 11,462,059 B2
(45) Date of Patent: Oct. 4, 2022

(54) ENGINE CONTROL SYSTEM

(71) Applicant: Joshuah W. Gray, Bellevue, WA (US)

(72) Inventor: Joshuah W. Gray, Bellevue, WA (US)

( * ) Notice: Subject to any disclaimer, the term of this patent is extended or adjusted under 35 U.S.C. 154(b) by 0 days.

(21) Appl. No.: 17/560,473

(22) Filed: Dec. 23, 2021

(65) Prior Publication Data

US 2022/0270412 A1 Aug. 25, 2022

Related U.S. Application Data

(60) Provisional application No. 63/152,413, filed on Feb. 23, 2021.

(51) Int. Cl.
| | | |
|---|---|---|
| *G07C 5/00* | (2006.01) | |
| *F02D 41/24* | (2006.01) | |
| *F02D 41/26* | (2006.01) | |
| *G01S 19/42* | (2010.01) | |
| *G07C 5/08* | (2006.01) | |

(52) U.S. Cl.
CPC ......... *G07C 5/008* (2013.01); *F02D 41/2487* (2013.01); *F02D 41/26* (2013.01); *G01S 19/42* (2013.01); *G07C 5/0825* (2013.01); *F02D 2200/04* (2013.01); *F02D 2200/501* (2013.01)

(58) Field of Classification Search
USPC .......................................................... 701/51
See application file for complete search history.

(56) References Cited

U.S. PATENT DOCUMENTS

| | | | |
|---|---|---|---|
| 6,198,996 B1* | 3/2001 | Berstis | .................. B60R 25/241 |
| | | | 726/20 |
| 7,899,610 B2 | 3/2011 | McLellan | |
| 7,928,837 B2 | 4/2011 | Drew et al. | |
| 9,123,186 B2 | 9/2015 | Ricci | |
| 9,481,288 B1 | 11/2016 | Palmer | |
| 9,563,988 B2 | 2/2017 | Drew et al. | |
| 10,145,313 B2 | 12/2018 | Ryu et al. | |
| 2007/0185627 A1 | 8/2007 | Mavreas | |
| 2008/0183449 A1* | 7/2008 | Grichnik | ............... B60W 40/10 |
| | | | 703/8 |
| 2009/0028440 A1* | 1/2009 | Elangovan | ............. H04N 5/265 |
| | | | 382/103 |
| 2017/0175661 A1 | 6/2017 | Kumar et al. | |

* cited by examiner

*Primary Examiner* — Tyler D Paige
(74) *Attorney, Agent, or Firm* — Christopher Mayle; Bold IP, PLLC (57) ABSTRACT

A system and method for monitoring vehicle performance and updating engine control parameters, which provides a solution to the problem of tuning engine control parameters for a vehicle. The core components of the invention are an engine controller coupled to an interface device which communicates with a remote device. Generally speaking, the components are configured as follows: the engine controller receives signals from various sensors in a vehicle and the engine controller controls the engine based on engine control parameters and the signals from the sensors. The interface device monitors the engine control and sensor signals and transmits information to the remote device. The remote device receives the information and sends back updated engine control parameters. The interface device receives the updated engine control parameters and communicates with the engine controller to update the engine control parameters using the updated engine control parameters.

19 Claims, 8 Drawing Sheets

| RPM/MAP | 2000 | 2200 | 2400 | 2600 | 2800 | 3000 | 3200 |
|---|---|---|---|---|---|---|---|
| 3.0 | 12.0 | 12.0 | 12.1 | 12.1 | 12.2 | 12.3 | 12.4 |
| 0.0 | 11.1 | 11.1 | 11.2 | 11.2 | 11.4 | 11.5 | 11.6 |
| -3.0 | 8.8 | 8.8 | 8.9 | 9.0 | 9.0 | 9.1 | 9.2 |
| -6.0 | 6.7 | 6.7 | 6.8 | 6.8 | 6.8 | 6.9 | 6.9 |
| -9.0 | 4.5 | 4.5 | 4.5 | 4.6 | 4.6 | 4.7 | 4.7 |
| -12.0 | 4.5 | 4.5 | 4.5 | 4.6 | 4.6 | 4.7 | 4.7 |
| -15.0 | 4.5 | 4.5 | 4.5 | 4.6 | 4.6 | 4.7 | 4.7 |

RPM(rpm) v. MAP(psi) fuel table(ms)

FIG. 7

ENGINE CONTROL SYSTEM

CROSS REFERENCE TO RELATED APPLICATIONS

This application claims priority to U.S. Provisional Patent No. 63/152,413 filed on Feb. 23, 2021, which is incorporated in its entirety.

BACKGROUND

Engine controllers (engine control units, engine control modules, and other vehicle control modules) are used in various types of vehicles to control the operation of the engine. For example, engine timing, fuel to air ratio, and other parameters may be controlled using an engine controller.

Engine control parameters can be adjusted in a tuning process. Generally, tuning is accomplished by recording engine performance (e.g., horsepower, oxygen compensation, fuel consumption, etc.) as the engine is operated, then examining the recorded data for suboptimal performance, and modifying the engine control parameters to attempt to remedy the suboptimal performance. The new set of parameters are then tested.

For high performance vehicles, such as professional race cars, the forces on the vehicle can be extreme while in operation, which can significantly affect engine performance and can be difficult to simulate. Accordingly, engine tuning is performed on many professional race cars based on operation on the vehicle race tracks. Normally this is accomplished by having the vehicle run one or more laps and then come back to the pits to have recorded engine performance data downloaded and analyzed. Adjusted parameters are then uploaded to the engine controller on the vehicle and these new parameters are tested. This process is very laborious and can take several hours, including significant time when the Tuner (person performing the tuning) is waiting, and also significant time when the Driver (operator of the vehicle) is waiting. Practice time on tracks is often very expensive, so this process can lead to significant costs as well.

Furthermore, generally an engine tune is not adjustable during the course of a race. Portions of a course may have tight turns or inclines where optimal lower end torque would lead to optimal performance. Other portions of the course may have large straight sections where optimal top speeds would lead to optimal performance. Some courses also have different types of surfaces (e.g., paved section and dirt sections) where different engine control parameters would be optimal for each different type of surface. Generally, a single set of parameters will be used for the entire race which will be a compromise set of engine control parameters. A single set of parameters may not be able to optimize engine performance for all portions of a course.

SUMMARY

The disclosed device is unique when compared with other known devices and solutions because it allows for real time adjustment of engine control parameters and allows for engine control parameters to be adjusted during a race when communication with outside devices may be prohibited by race rules.

The disclosed device is unique in that it is structurally different from other known devices or solutions. More specifically, the device is unique due to the presence of: (1) an interface device with a display that provides information to a driver and communicates with a remote device; and (2) the interface device which communicates with the engine controller to adjust engine control parameters during vehicle operation.

DETAILED DESCRIPTION

In the Summary above, in this Detailed Description, the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limits include both numbers. For example, "25 to 100" means a range whose lower limit is 25 and upper limit is 100 and includes both 25 and 100.

Figure 1:
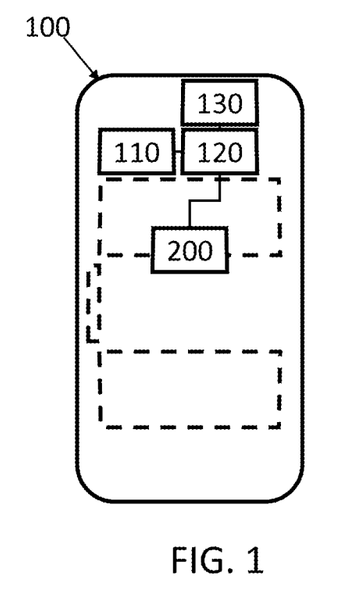
FIG. 1 shows an example schematic view of a vehicle.

FIG. 1 shows an example schematic view of a vehicle 100. Exterior elements of the vehicle 100 are shown in dashed lines. The vehicle may include an engine controller 110 with a communication bus 120, sensors 130, and interface device 200. The engine controller 110 may be an engine control unit or engine control module configured to control various functions of the engine (not shown) of the vehicle 100 and other portions of the vehicle. The engine controller 110 may include an engine control module, engine control unit, transmission control module, and other vehicle control modules. In a vehicle with an automatic transmission, the engine controller 110 may include a powertrain control module that controls the vehicle's 100 engine and transmission. As another example, the engine controller 110 may have distinct modules or portions that may communicate via the communication bus 120. Examples of functions of the engine that the engine controller may control are: fuel injection timing and duration, exhaust valve timing and duration open, air intake valve timing and duration open, ignition timing, etc. The engine controller may control the engine functions based on data received from the sensors 130 and engine control parameters programmed into the engine controller.

The sensors 130 may sense a variety of engine and vehicle conditions. For example, the sensors 130 may include an oxygen sensor that senses oxygen in the exhaust, a thermometer that measures temperature of engine coolant, an accelerometer ("g sensor") that senses vehicle acceleration, mass air flow (MAF) sensor that measures mass of air intake, manifold absolute pressure (MAP) sensor that measures air intake pressure, barometric sensor that measures outside air pressure, oil temperature sensor, air fuel ratio sensor that measures air and fuel ratio at intake, oxygen sensor that measures oxygen in exhaust, wheel speed sensor, speedometer, crankshaft position sensor (used to determine revolutions per minute (RPM) of engine), and a global positioning system (GPS) that determines a position of the vehicle (alternatively the interface device 200 may include a GPS).

The sensors 130 may be connected to the engine controller 110 via the bus 120. The bus 120 may be a controller area network (CAN) bus. The interface device 200 may also be connected to the bus 120 and may communicate with the engine controller 110 via the bus 120 through a diagnostic port in the bus 120. The interface device 200 may also receive information from the sensors 130 via the bus 120. Alternatively, the interface device 200 may receive sensor information from the sensors via the engine controller 110.

Figure 2:
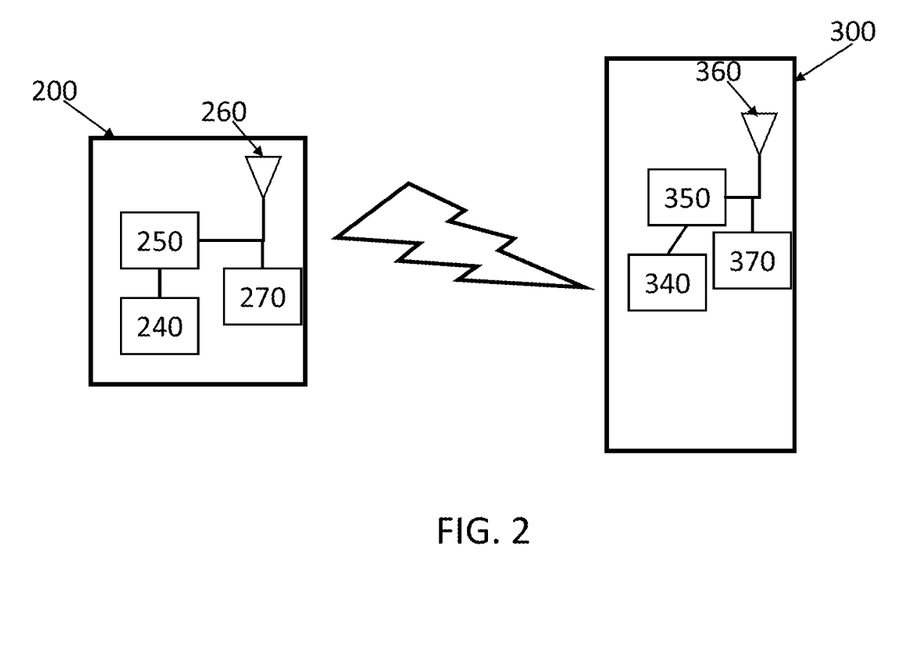
FIG. 2 shows an example schematic view of an interface device and remote device.

FIG. 2 shows an example schematic view of an interface device 200 and remote device 300. The interface device 200 may include at least one memory 240, at least one processor 250, communication hardware 260, and a display 270. The memory 240 may include volatile and non-volatile memory. The memory 240 may be configured to store information thereon including instructions to operate the interface device 200.

The processor 250 may include a central processing unit, or other hardware capable of executing the instructions stored on the memory 240. The processor 250 may be configured to execute the instructions stored on the memory 240 to control the interface device 200.

The communication hardware 260 may include hardware (such as a port) for communicating with the engine controller 110 over a wired connection via the bus 120. The communication hardware 260 may also include hardware for communicating with the remote device 300 wirelessly (e.g., WI-FI, 4G, 4G LTE, 5G, Radio frequency).

The display 270 may display information to a driver of the vehicle 100 (or other person in the vehicle 100). The display 270 may include a touch screen that accepts user input and is easy to operate while driving.

The remote device 300 may include at least one memory 340, at least one processor 350, communication hardware 360, and a display 370. The memory 340 may include volatile and non-volatile memory. The memory 340 may be configured to store information thereon including instructions to operate the remote device 300.

The processor 350 may include a central processing unit or other hardware capable of executing the instructions stored on the memory 340. The processor 350 may be configured to execute the instructions stored on the memory to control the remote device 300.

The communication hardware 360 may include hardware for communicating with the interface device 200 wirelessly (e.g., Wi-Fi, 4G, 4G LTE, 5G).

The display 370 may display information to a driver of the vehicle 100 (or other person in the vehicle 100). The display 370 may include a touch screen that accepts user input and is easy to operate while driving.

Figure 3:
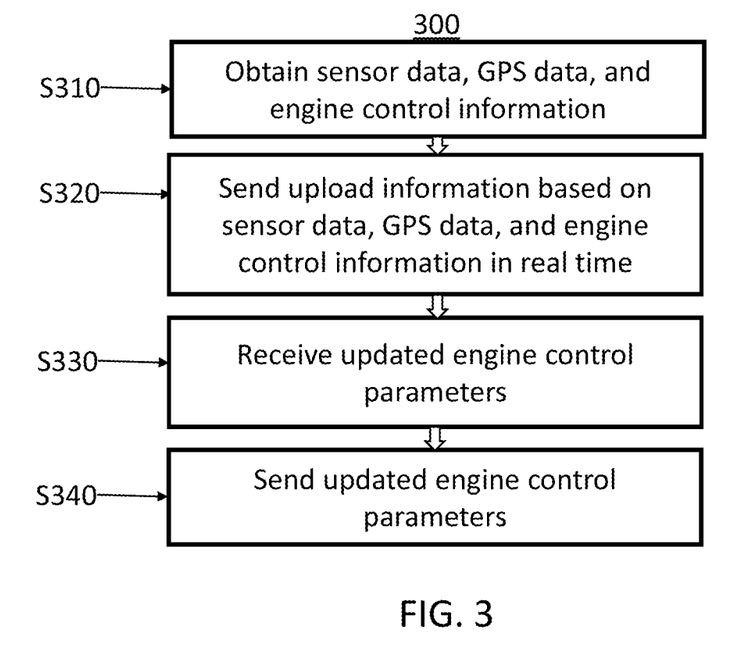
FIG. 3 shows an example flow diagram of operations performed by the interface device.

FIG. 3 shows an example flow diagram of operations performed by the interface device 200. At S310, the interface device 200 may obtain sensor data from the sensors 130, GPS data from the GPS, and engine control information from the engine controller 110 in real time (e.g., as it is generated or within about 3 seconds of generation). Restated, the interface device 200 may receive a constant stream of sensor data, GPS data, and engine control information while the vehicle is operating. The sensor data may include input from the sensors 130. For example, sensor data may include oxygen readings from the oxygen sensor, air intake readings from the MAF sensor, etc. The GPS data may include a determined position of the vehicle in real time or satellite readings that may be used to determine the position of the vehicle in real time. The engine control information may include the implemented engine control parameters and information that is derived from the sensor data such as revolutions per minute (RPM) derived from crankshaft position sensor data, etc. The interface device 200 may also receive the current engine control parameters from the engine controller 110. The engine control parameters may include matrixes with control parameters or values for various engine control parameters. For example, the engine control parameters may include a matrix of fuel injection time for a range of values of RPMs and MAP. The engine control parameter matrices may have two or more dimensions.

At S320, the interface device 200 may send upload data based on the received sensor data, GPS data, and engine control information to the remote device 300 in real time (e.g., upon receiving the data or within about 3 seconds of receiving the data). Restated, the interface device 200 may send a constant stream of upload data to the remote device 300 while the vehicle is in operation. In some embodiments, some processing may be done to the received sensor data, GPS data, and engine control information before sending the upload information to the remote device 300. For example, GPS data that includes satellite readings, may be converted into GPS data that includes coordinates of the vehicle location. In some embodiments, the upload information may include the received sensor data, GPS data, and engine control information as well as the information derived from the received sensor data, GPS data, and engine control information.

At S330, the interface device 200 may receive updated engine control parameters from the remote device 300. The updated engine control parameters may include individual parameters that should be updated or an entire replacement set of engine control parameters. At S340, the interface device 200 may send the updated engine control parameters to the engine controller 110 with instructions to implement the updated engine control parameters.

Accordingly, the interface device 200 may function to facilitate communications between the engine controller 110, and the remote device 300 to implement new engine control parameters in the engine controller 110 while the vehicle is being operated by conveying information pertaining to the operation of the vehicle (upload data based on sensor data, GPS data, and engine control information) to the remote device 300 and convey updated engine control parameters to the engine controller 110.

Figure 4:
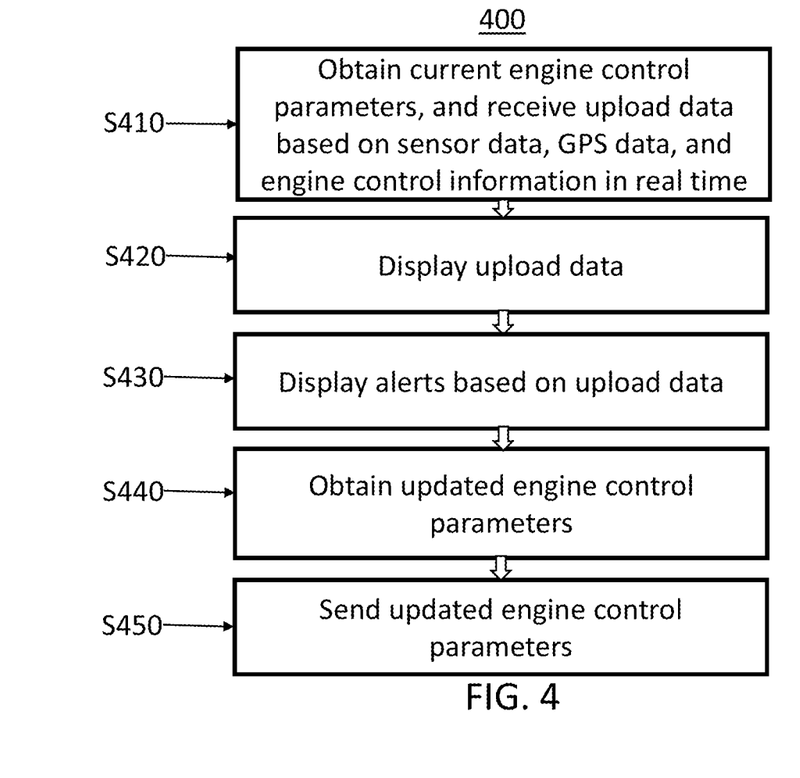
FIG. 4 shows an example flow diagram of operations performed by the remote device.

FIG. 4 shows an example flow diagram of operations performed by the remote device 300. At S410, the remote device 300 may obtain the current engine control parameters and receive upload data based on the sensor data, the GPS data, and the engine control information in real time. The current engine control parameters may be obtained in various ways, including through wireless communication with the interface device 200, from a file upload independent of the wireless communication with the interface device, and generation of the current engine control parameters on the remote device 300. The upload data may be received from the interface device 200 via wireless communication.

At S420, the remote device 300 may display upload data on the display 370. The upload data may be displayed as graphs, matrixes, maps, etc. The upload data may be displayed in real time. Displaying information based on the upload data may also be considered displaying the upload data. For example, the GPS data of the vehicle 100 may be used to display a location of the vehicle on a generated map or course map. The RPM in combination with GPS data, acceleration data, and topographic information of the map may be used to display estimated horsepower output of the vehicle's 100 engine.

At S430, the remote device 300 may display alerts based on the upload data and alert settings. For example, the alert settings may be set such that any time oxygen levels in the exhaust are outside of a certain range an alert will be sent, with the location of the vehicle at the time of the oxygen levels being sensed as being outside of the range being indicated. Accordingly, pertinent information may be displayed to a Tuner (a user of the remote device 300), who may then adjust engine control parameters based on the alert. Other information related to the alert may also be displayed with the alert, such as vehicle position (including elevation and topography (e.g., incline, decline, turn radius, etc.)), acceleration, speed, RPM, MAF or MAP, etc.

At S440, the remote device 300 may obtain updated engine control parameters. The updated engine control parameters may be obtained by a user entering the updated engine control parameters to the remote device 300. The Tuner may use the displayed uploaded data and alerts to determine which engine control parameters need to be changed and by how much.

The updated engine control parameters may also be uploaded from another device or generated based on the uploaded data using a program on the remote device 300. At S450, the remote device 300 may send the updated engine control parameters to the interface device 200 via wireless communication. Accordingly, the remote device 300 may be configured to facilitate the tuning of the engine control parameters of the vehicle's 100 engine controller 110 while the vehicle is being operated.

Figure 5:
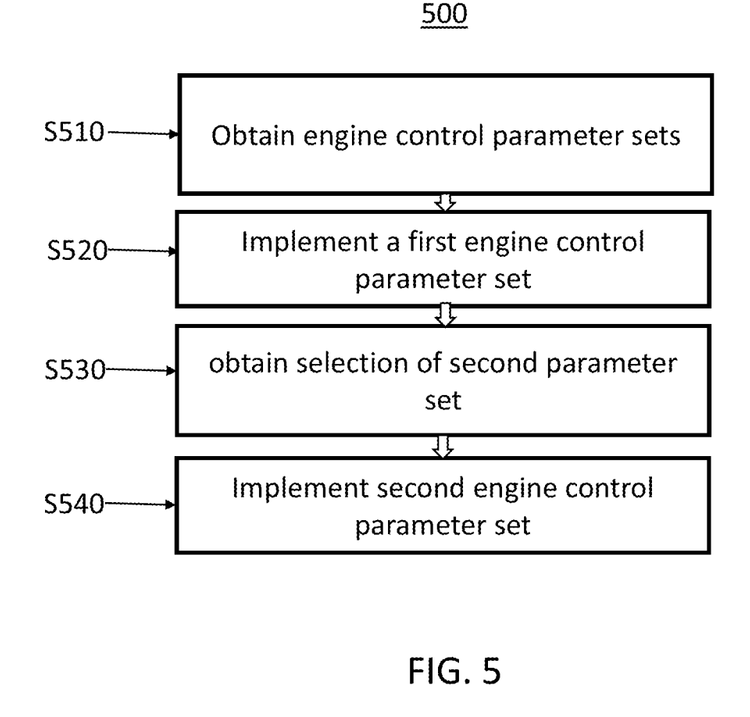
FIG. 5 shows an example flow diagram of operations performed by the interface device.

FIG. 5 shows an example flow diagram of operations performed by the interface device 200. At S510, the interface device 200 may obtain sets of engine control parameters. The interface device 200 may obtain the sets of engine control parameters from the remote device 300, the engine controller 110, and/or the sets of control parameters may be uploaded to the device from another source. Engine control parameters may be optimized for different circumstances. Engine control parameters may be optimized for dirt roads vs paved roads, straight aways vs curved or hilly roads, or wet pavement vs dry pavement. Roads and racing courses often have different characteristics at different points in the course (straight aways vs curved or hilly portions) or at different times (when it is raining and the roads are wet vs when the roads are dry). Accordingly, it may be advantageous for the interface device 200 to have stored on the memory 240 several sets of engine control parameters, which each may be preferred for a different course condition. Each engine control parameter set included in the sets of engine control parameters may be a full or partial set of engine control parameters used by the engine controller 110.

At S520, the interface device 200 may send instructions to the engine controller 110 to implement a first engine control parameter set. Alternatively, the engine controller 110 may be allowed to operate with the first engine control parameters set which is already being implemented by the engine controller 110.

At S530, the interface device 200 may obtain a selection of a second engine control parameter set, which is at least partially different from the first parameter set. The selection of the second parameter set may be obtained by the Driver inputting (touching) into the display 270 (if the display has a touch screen) the selection. For example, the display 270 may display options for engine control parameter sets. The Driver may select the second parameter set by touching the display of the name of the second parameter set on the screen.

Alternatively, a course map may be stored in the memory 240 and a set of coordinates may be programmed into the interface device 200 such that when the vehicle reaches a certain location (determined using GPS data), the processor will select the second engine control parameter set. For example, if a course changes from paved to dirt at a first location. The interface device 200 may be programmed to select the second engine control parameter set (i.e., obtain the selection of the second parameter set) when the GPS data indicates the vehicle 100 is at the first location or has passed the first location. Then, when the vehicle 100 arrives at the first location, the interface device 200 may obtain the selection of the second engine control parameter set. As another alternative, the selection of the second engine control parameter set may be obtained from the remote device 300.

At S540, the interface device 200 may send instructions to the engine controller 110 to implement the second parameter set. The engine controller 110 may then update the engine control parameters based on the second parameter set.

Figure 6:
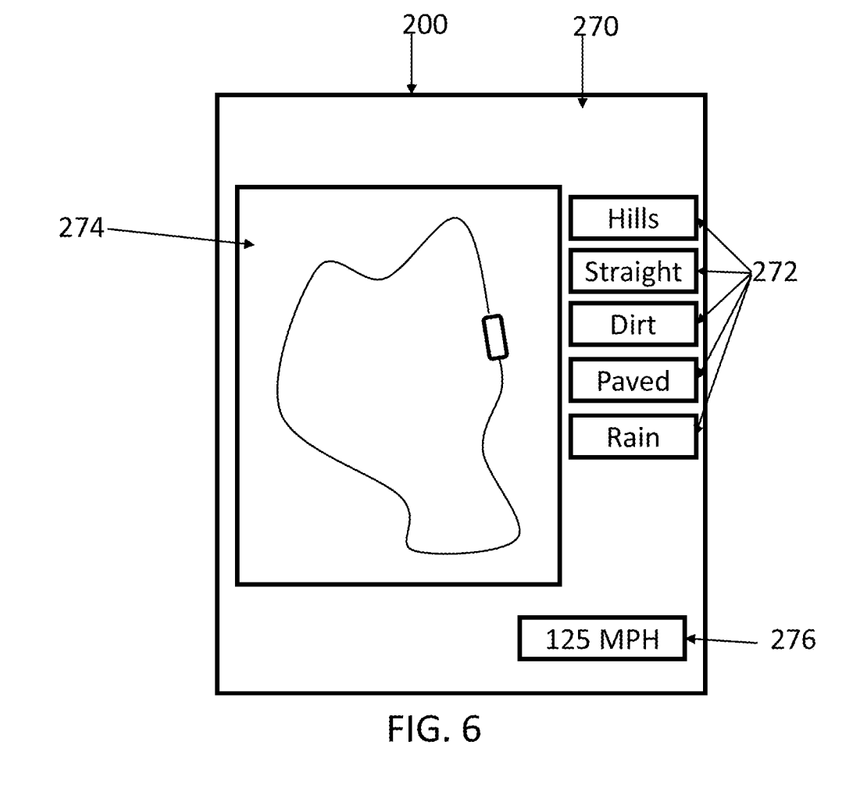
FIG. 6 shows an example display on the interface device.

FIG. 6 shows an example display on the interface device 200. The display 270 of the interface device 200 may display a map 274 where a course map or other form of map is displayed with the location of the vehicle 100 indicated. The display 270 may also display options for sets of engine control parameters 272. For example, the options for sets of engine control parameters 272 may include "hills,"

"straight," "dirt," "paved," and "rain." The options may be selected through a touch over the display of the option. The display 270 may also include vehicle information 276 such as speed, RPM, engine temperature, alerts, etc.

Figure 7:
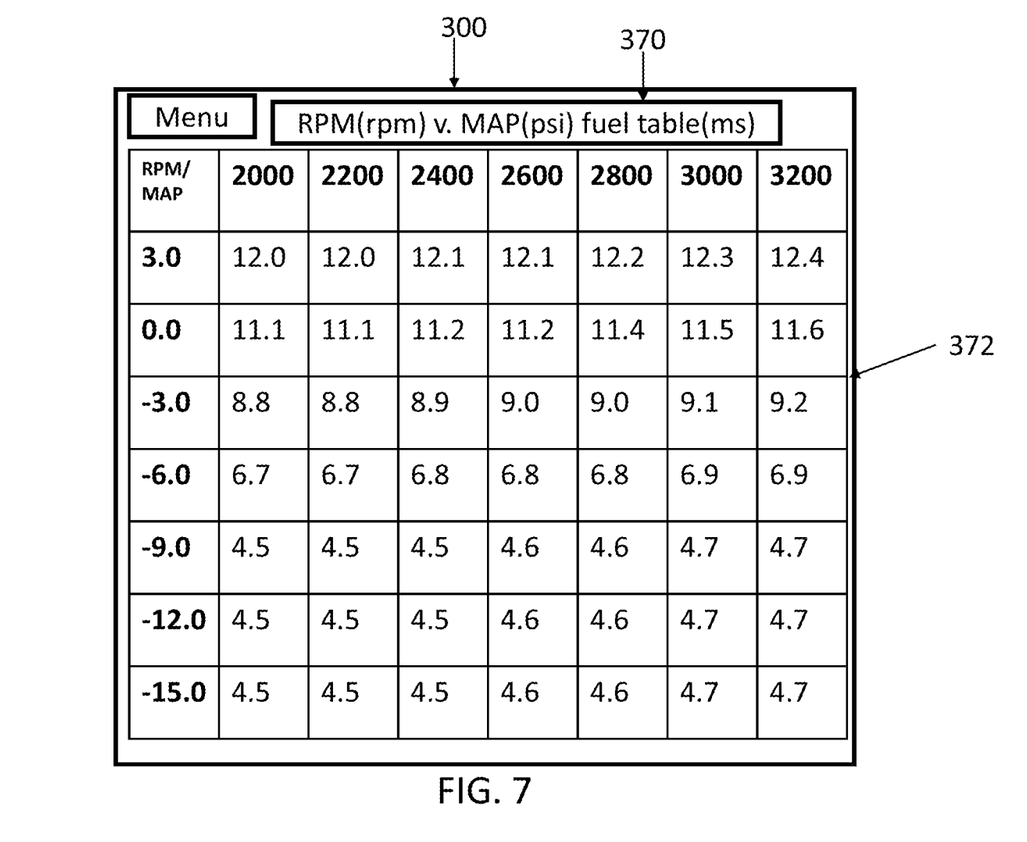
FIG. 7 shows a first example display on the remote device.

FIG. 7 shows a first example display on the remote device 300. The display 370 of the remote device 300 may display a portion of the engine control parameters 372. A Tuner may adjust the engine control parameters based on the upload data by selecting a cell in the portion of the engine control parameters 372 and entering a new value into the cell. The shown portion of the engine control parameters 372 is an example of a three-dimensional matrix for fuel injection time based on RPMs and MAP. A Menu or other form of navigational tool may be used to change which portion of the engine control parameters 372 is displayed or what upload data is displayed.

Figure 8:
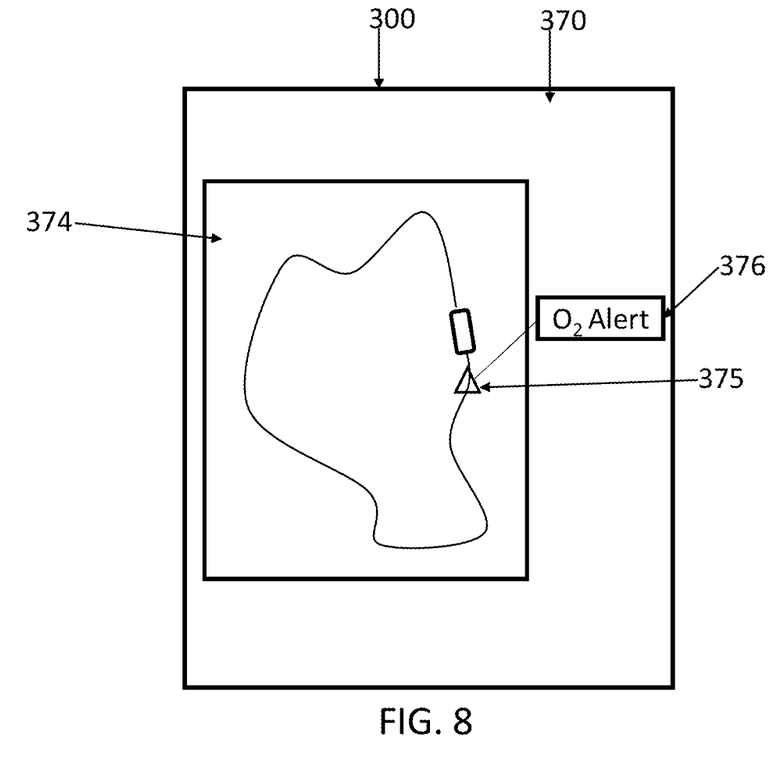
FIG. 8 shows a second example display on the remote device.

FIG. 8 shows a second example display on the remote device 300. The display 370 of the remote device 300 may display a map 374 of the course or other map with indications of locations 375 where alerts 376 were triggered and what type of alert 376 was triggered. For example, an alert 376 for the oxygen sensor is displayed with a triangle on the map 374 to indicate the location of the alert. When an alert is selected, the remote device 300 may display the various conditions when the alert happened (such as RPM, MAP, elevation, topography data, etc.) to assist the tuner to know how to correct the situation that caused the alert 376. The parameters for alerts may be pre-programmed, set by the Tuner, or received from the interface device 200. For example, an alert 376 may be triggered if the oxygen level in the exhaust is sensed outside of a certain range.

Advantageously, a vehicle 100 that includes an interface device 200 which communicates with a remote device 300 may make adjustments to the tune (i.e., adjusting engine control parameters) of the engine controller 110 using the interface device 200 while the vehicle is operated. Accordingly, much of the time that is currently wasted while either the Driver is waiting for the Tuner to upload data from the engine controller, find problems in the data, and adjust the engine control parameters or the Tuner is waiting for the driver to complete a lap to see if the new engine control parameters have solved or mitigated the problem can be greatly reduced.

Also advantageous, the upload of GPS data to the remote device 300 allows the Tuner to know what road conditions (curves, hills, etc.) the driver the vehicle 100 was facing when the problem that caused the alert 376 to occur. Thus, it is far easier for the Tuner to recognize where course related problems are coming from.

A further advantage of the interface device 200 is that the interface device can store and cause to be implemented multiple engine control parameter sets based on driver input or pre-programming. Thus, even in a race where external communication is not allowed, the Driver can adjust the tune (by implementing a different set of engine control parameters) of the engine controller 110.

Accordingly, the present description provides for various embodiments for an engine control system. Many uses and advantages are offered by the engine control system as described above in one or more non-limiting embodiments in the present description.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

What is claimed is:

1. An engine control system comprising:
   a control module that controls an engine and transmission of a vehicle;
   an interface device;
   one or more databases having predefined control parameters and one or more course maps with a first location with a first topography and a second location with a second topography different from the first topography; and
   one or more processors; one or more memory devices coupled to the one or more processors; and one or more computerized programs, wherein the one or more computerized programs are stored in the one or more memory devices and configured to be executed by the one or more processors, the one or more computerized programs including instructions for:
   obtaining sensor data from one or more sensors, GPS data of the vehicle, and engine control information;
   determining a location of the vehicle in response to the GPS data of the vehicle;
   automatically sending directives to implement a first controller parameter set with first tunings for fuel injection timing or exhaust valve timing or air intake valve timing or ignition timing to the engine when the vehicle has reached the first location; and
   automatically sending directives to implement a second controller parameter set of the predefined control parameters to the engine with second tunings for the fuel injection timing or the exhaust valve timing or the air intake valve timing or the ignition timing to the engine when the vehicle has reached the first location when the vehicle has reached the second location.

2. The engine control system of claim 1, the one or more computerized programs including further instructions for: sending one or more alerts to a remote computing device that indicate parameters outside of predefine range and whether the location of the vehicle was at the first location or the second location as well as RPM, MAP, elevation, topography data.

3. The engine control system of claim 1, wherein the one or more sensors include one or more on one or more wheels for determining speed and one or more for determining oil temperature.

4. The engine control system of claim 1, wherein the one or more sensors include an accelerometer and speedometer.

5. The engine control system of claim 1, wherein the one or more sensors include a mass air flow sensor that measures mass of air intake and a manifold absolute pressure sensor that measures air intake pressure.

6. The engine control system of claim 1, wherein the first topography is a straight portion and wherein the second topography is a curved portion.

7. The engine control system of claim 1, wherein the first topography is dirt and wherein the second topography is a paved road.

8. An engine control system comprising:
a control module that controls an engine and transmission of a vehicle;
an interface device on the vehicle; and
one or more processors; one or more memory devices coupled to the one or more processors; and one or more computerized programs, wherein the one or more computerized programs are stored in the one or more memory devices and configured to be executed by the one or more processors, the one or more computerized programs including instructions for:
receiving upload data comprising sensor data, GPS data, and engine control information in real time during a race;
displaying the upload data on the interface device;
displaying alerts based on the upload data to a remote computing device in real time during the race;
obtaining updated engine control parameters from a remote device including tunings for fuel injection timing or exhaust valve timing or air intake valve timing or ignition timing to the engine, the remote device connected to the control module over a network; and
implementing the updated engine control parameters received from a touch based gesture on the remote device upon the engine.

9. The engine control system of claim 8, wherein the upload data is displayed on the remote device along with a three-dimensional matrix for fuel injection time based on RPMs and MAP.

10. The engine control system of claim 9, the one or more computerized programs further including instructions for: displaying the alerts when the updated engine control parameters are outside a predetermined range.

11. The engine control system of claim 10, the one or more computerized programs further including instructions for: generating a first course map for the race on the remote device from one or maps stored in one or more databases with indications of locations where the alerts were triggered and what type of alert was triggered.

12. The engine control system of claim 11, the one or more computerized programs further including instructions for: analyzing the GPS data, the sensor data, and topographic information of the first course map; and displaying estimated horsepower output of the engine of the vehicle.

13. The engine control system of claim 10, wherein the predetermined range is preprogrammed.

14. The engine control system of claim 12, wherein the predetermined range is inputted from the remote device.

15. An engine control system comprising:
a control module that controls an engine and transmission of a vehicle during a race;
an interface device in the vehicle configured to receive one or more touch based gestures; and
one or more processors; one or more memory devices coupled to the one or more processors; and one or more computerized programs, wherein the one or more computerized programs are stored in the one or more memory devices and configured to be executed by the one or more processors, the one or more computerized programs including instructions for:
sending directives to implement a first engine control parameter set with first tunings for fuel injection timing or exhaust valve timing or air intake valve timing or ignition timing to the engine by a first selection of a first icon on the interface device from the one or more touch based gestures;
obtaining selection of a second engine control parameter set with second tunings for the fuel injection timing or the exhaust valve timing or the air intake valve timing or the ignition timing to the engine by a second selection of a second icon on the interface device from the one or more touch based gestures; and
sending directives to implement the second engine control parameter set to the engine.

16. The engine control system of claim 15, the one or more computerized programs further including the instructions for: generating a first map on the interface device from one or maps stored in one or more databases with one or more coordinates.

17. The engine control system of claim 16, wherein the first icon and the second icon correspond with different weather conditions.

18. The engine control system of claim 16, wherein the first icon and the second icon correspond different curvature of the first map.

19. The engine control system of claim 16, the one or more computerized programs further including instructions for:
wherein the first icon and the second icon correspond different surfaces of track of the first map.

* * * * *